United States Patent [19]

Vogt

[11] Patent Number: 4,755,840

[45] Date of Patent: Jul. 5, 1988

[54] REFLEX APPARATUS FOR THE VIEWING OF THE GROUND-GLASS PLATE OF A PHOTOGRAPHIC CAMERA

[76] Inventor: Philippe Vogt, Frohalpstrasse 65, 8038 Zürich, Switzerland

[21] Appl. No.: 90,954

[22] Filed: Aug. 28, 1987

[30] Foreign Application Priority Data

Sep. 3, 1986 [CH] Switzerland .................. 3532/86

[51] Int. Cl.⁴ .................. G03B 13/08; G03B 19/12
[52] U.S. Cl. .................. 354/157; 354/158; 354/223; 354/224
[58] Field of Search ............. 354/157, 158, 223, 224

[56] References Cited

U.S. PATENT DOCUMENTS

| | | | |
|---|---|---|---|
| 536,820 | 4/1895 | Robinson | 354/224 X |
| 832,969 | 10/1906 | Hall | 354/158 |
| 3,921,189 | 11/1975 | Gallistel | 354/223 X |

*Primary Examiner*—Michael L. Gellner
*Attorney, Agent, or Firm*—Ostrolenk, Faber, Gerb & Soffen

[57] ABSTRACT

The apparatus includes a casing, in which a reflector is mounted, which casing is attached on the one hand to a supporting frame and on the other hand via a bellows to the frame. The supporting frame is intended to be slipped onto the ground-glass plate of a camera. The adjusting is made by means of an adjusting means which includes an adjusting segment, a locking member and a releasing member. By operating the releasing member the locking member may be brought into engagement and out of engagement with the adjusting segment.

8 Claims, 1 Drawing Sheet

REFLEX APPARATUS FOR THE VIEWING OF THE GROUND-GLASS PLATE OF A PHOTOGRAPHIC CAMERA

BACKGROUND OF THE INVENTION

1. Field of the Invention

The present invention relates to a reflex apparatus for the viewing of the ground-glass plate of a photographic camera including an object-glass carrier and an image carrier, which carriers are adjustable relative to each other, including further a reflector located within a casing mountable to the image carrier and having an eyepiece opening for the viewing of the reflector and a light admission opening to be located behind the ground-glass plate.

2. Description of the Prior Art

The Swiss patent specification CH-PS No. 432 229 discloses an apparatus for the viewing of a ground-glass plate of a camera, which includes a casing, a reflector supported movably in the casing and an eyepiece which is mounted such to the reflector that the image on the ground-glass plate may be selectively viewed directly or via the reflector. This design displays, however, the drawback that the image on the ground-glass plate represents itself variously to the viewer.

The Swiss patent specification CH-PS No. 443 883 discloses a reflex apparatus, in which the reflector is pivotably arranged within a casing and adjustable from the outside by means of an operating member. This design necessitates, however, conclusively that the casing must have rather large dimensions which is a drawback.

SUMMARY OF THE INVENTION

It is an object of the invention to provide a reflex apparatus which allows a large range of adjustability, in which the eyepiece angle eye-reflector remains constant and the brightness or distinctness, respectively, of the image is optimal when the camera is adjusted.

A further object of the invention is to provide a reflex apparatus for the viewing of the ground-glass plate of a photographic camera, in which the reflector is mounted to a wall of the casing opposite of the eyepiece opening and the light admission opening, further in which the casing is mounted movable relative to the ground-glass plate and the casing is attachable at the light admission opening via a bellows to the image carrier.

BRIEF DESCRIPTION OF THE DRAWINGS

The present invention will be more fully understood by reference to the following detailed description thereof when read in conjunction with the attached drawings, and wherein.

DESCRIPTION OF THE PREFERRED EMBODIMENT

Figure 1:
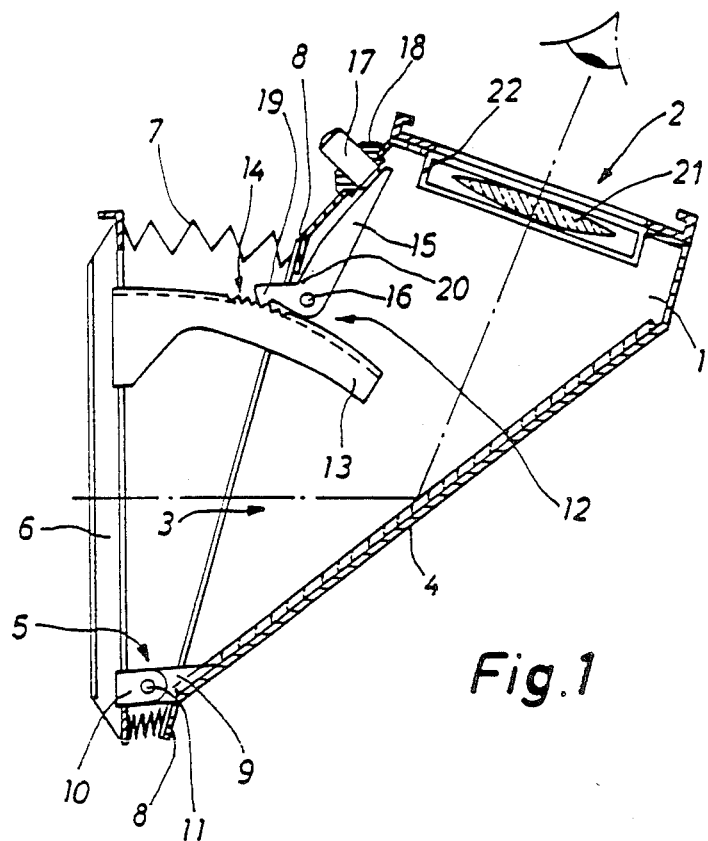
FIG. 1 is a sectional view of a preferred embodiment of the reflex apparatus of the present invention.
Figure 2:
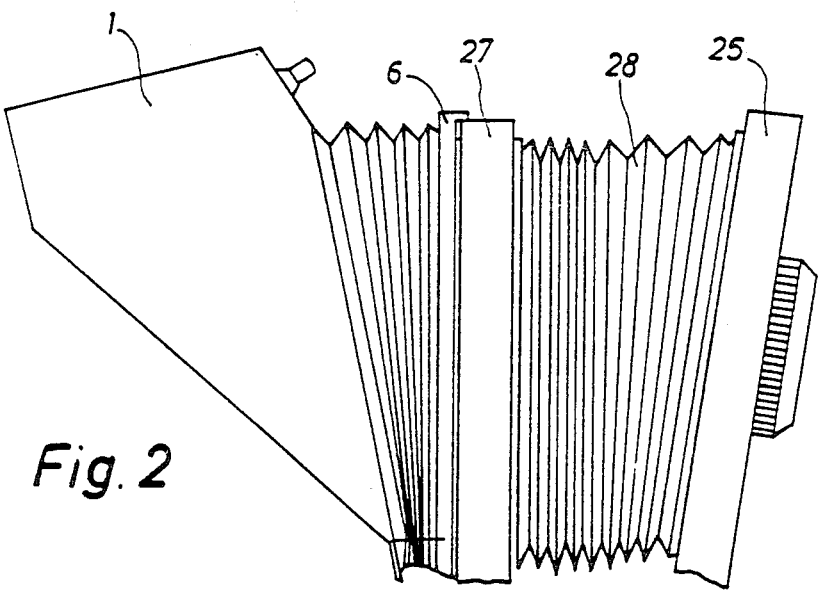
FIG. 2 is a side view of a part of a largeformal camera including the reflex apparatus illustrated in FIG. 1.

The reflex apparatus includes a casing 1 having an eyepiece opening 2 and a light admission window 3 and a reflector 4, which is mounted to a wall of the casing 1 located oppositely of the eyepiece opening 2 and light admission window 3. The casing 1 is hingedly connected on the one hand by means of a pivot device 5 to a supporting frame 6 and is on the other hand attached thereto via a bellows 7. The supporting frame 6 is designed such that it can be slipped onto the not particularly illustrated ground-glass plate frame of a camera. It shall be noted here that the supporting frame may be mounted to the ground-glass plate in various ways. The light admission window 3 is defined by the edge sections 8 of the casing 1, which edge sections serve simultaneously for the mounting of the bellows 7.

The pivot device 5 includes two pivoting strips 9, 10, mounted to the casing 1 and supporting frame 6, respectively, and includes further a pivot pin 11 and is arranged within the bellows 7.

In order to view the ground-glass plate image it is necessary to adjust the casing 1. In order to accomplish this at least one adjusting means 12 is provided, which is located laterally adjacent the light admission window 3 such that the reflector 4 is pivotable relative to the supporting frame 6 and conclusively to the not specifically illustrated ground-glass plate. The adjusting means includes an adjusting segment 13 mounted in a self-supporting fashion to the supporting frame 6 and including a rack segment 14, a locking member 15 which is arranged to pivot around an axis 16 in the casing 1 and an operating member 17 mounted in a guide bushing 18 at the casing 1 and abuts the locking member 15. The locking member 15 is designed as elbow lever, of which one lever arm abuts the operating member 17 and the lever arm includes a section 19, which can be moved into engagement and out of engagement with the segmental rack 14 of the adjusting segment 13. In order to avoid an accidental adjusting a spring means 20 is provided, by means of which the locking member 15 is kept via its section 19 in engagement with the segmental rack 14. In order to allow an adjusting of the casing 1 it is, therefore, necessary to push in the operating member 17 such to pivot the elbow lever 15 against the force exerted by the spring member 20 and such to lift section 19 out of the teeth of the rack.

A magnifier 21 is located at the eyepiece opening 2 and held at the casing 1 by means of a magnifier support 22. At the outer side of the eyepiece opening 2 there is provided a fastener 23 for a not particularly illustrated eyepiece tube. In this context it shall be noted that the reflex apparatus can be used also without such a magnifier 21.

FIG. 1 illustrates the reflex apparatus in a large-format camera. The large-format camera incudes an object-glass carrier including the lens or objective 26, an image carrier 27 and a bellows 28. For viewing of the image on the ground-glass plate the reflex apparatus is slipped by the agency of the supporting frame 6 onto the image carrier 27.

While there is shown and described a present preferred embodiment of the invention, it is to be distinctly understood that the invention is not limited thereto, but may be otherwise variously embodied and practiced within the scope of the following claims.

I claim:

1. A reflex apparatus for the viewing of the ground-glass plate of a photographic camera including an object-glass carrier and an image carrier, which carriers are adjustable relative to each other, including further a reflector located within a casing mountable to the image carrier and having an eyepiece opening for the viewing of the reflector and a light admission opening to be located behind the ground-glass plate, in which the reflector is mounted to a wall of the casing opposite of the eyepiece opening and the light admission opening, further in which the casing is mounted movable relative to the ground-glass plate and the casing is attachable at the light admission opening via a bellows to the image carrier.

2. The reflex apparatus of claim 1, in which the casing is pivotable around an axis extending parallel to the ground-glass plate, which axis is located close to one edge of the ground-glass plate of the image carrier.

3. The reflex apparatus of claim 2, comprising a supporting frame to be slipped onto the image carrier in order to locate the casing at the image carrier.

4. The reflex apparatus of claim 3, in which the bellows is mounted to the supporting frame.

5. The reflex apparatus of claim 3, in which the casing is mounted via a pivot device to the supporting frame.

6. The reflex apparatus of claim 1, comprising at least one adjusting means for allowing an adjusting of the casing including the reflector to a plurality of various pivot positions.

7. The reflex apparatus of claim 6, in which the pivot device and the adjusting means are located within the bellows.

8. The reflex apparatus of claim 6, in which the adjusting means comprises an adjusting element mounted to the supporting frame and including a segmental rack, a locking member pivotably mounted to the casing and controllable into and out of elements with the segmental rack of the adjusting means, and further an unlocking releasing member located at the outside of the casing and abutting the locking member, which locking member is held in engagement with the adjusting means by means of a resilient member.

* * * * *